(12) United States Patent
Matsunaka (10) Patent No.: US 11,563,863 B2
(45) Date of Patent: Jan. 24, 2023

(54) IMAGE READING DEVICE AND COMMUNICATION TEST METHOD

(71) Applicant: SEIKO EPSON CORPORATION, Tokyo (JP)

(72) Inventor: Kenji Matsunaka, Kitakyushu (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/450,730

(22) Filed: Oct. 13, 2021

(65) Prior Publication Data
US 2022/0124206 A1 Apr. 21, 2022

(30) Foreign Application Priority Data
Oct. 16, 2020 (JP) .............................. JP2020-174482

(51) Int. Cl.
*H04N 1/00* (2006.01)

(52) U.S. Cl.
CPC ....... *H04N 1/00079* (2013.01); *H04N 1/0001* (2013.01); *H04N 1/00013* (2013.01); *H04N 1/0014* (2013.01); *H04N 1/00029* (2013.01); *H04N 1/00822* (2013.01); *H04N 1/00896* (2013.01)

(58) Field of Classification Search
CPC .................. H04N 1/00079; H04N 1/00029
See application file for complete search history.

(56) References Cited

U.S. PATENT DOCUMENTS

| | | | |
|---|---|---|---|
| 2003/0200265 A1* | 10/2003 | Henry ............... | H04N 1/00209 709/206 |
| 2011/0051190 A1* | 3/2011 | Abe .................... | H04N 1/00474 358/1.15 |
| 2013/0088749 A1* | 4/2013 | Park ...................... | G06F 1/3284 358/1.15 |
| 2014/0019783 A1* | 1/2014 | Ooba ........................ | G06F 1/28 713/300 |
| 2015/0301765 A1* | 10/2015 | Nishiyama ............ | G06F 3/1285 358/1.15 |
| 2020/0099819 A1* | 3/2020 | Shiraki .............. | H04N 1/33346 |
| 2022/0019394 A1* | 1/2022 | Sako ...................... | G06F 3/1203 |

FOREIGN PATENT DOCUMENTS

JP 2020-092376 6/2020

* cited by examiner

*Primary Examiner* — Benjamin O Dulaney
(74) *Attorney, Agent, or Firm* — Workman Nydegger (57) ABSTRACT

An image reading device including a reading transmission function of transmitting read data, generated by reading an original document, to a storage destination for storing the read data, the storage destination being included in an external device, the image reading device including a control unit configured to execute a communication test for determining whether communication with the storage destination is successfully performed, wherein the control unit includes a manual test mode for starting the communication test in response to an execution instruction of the communication test from a user and an automatic test mode for starting the communication test when a starting condition for starting the communication test is satisfied.

11 Claims, 10 Drawing Sheets

```
                  ┌─ 43
SCAN-TO-FOLDER DESTINATION REGISTRATION
  REGISTRATION  1
  NUMBER
  NAME        [                    ]
  TYPE        [ Network Folder (SMB) ]
  DESTINATION [ 192.168.1.100/Share···]  ─ 43a
  USERNAME    [ *****              ]
  PASSWORD    [ ********           ]

43b ─[ REGISTRATION ]    [ Cancel ]─ 43c
```

FIG. 4

| REGISTRATION NUMBER | NAME | TYPE | DESTINATION | USERNAME | PASSWORD |
|---|---|---|---|---|---|
| 1 | | Network Folder (SMB) | ********** | *abc***** | ****** |
| 2 | | Network Folder (SMB) | ...... | ...... | ...... |
| 3 | | Network Folder (SMB) | ...... | ...... | ...... |

IMAGE READING DEVICE AND COMMUNICATION TEST METHOD

The present application is based on, and claims priority from JP Application Serial Number 2020-174482, filed Oct. 16, 2020, the disclosure of which is hereby incorporated by reference herein in its entirety.

BACKGROUND

1. Technical Field

The present disclosure relates to an image reading device and a communication test method.

2. Related Art

A scanner is implemented with an ability to transmit and store read data, generated by reading an original document, to a storage destination in a storage region of a personal computer (PC) based on a Server Message Block (SMB) protocol. Refer to, for example, JP-A-2020-92376. Such a function is also referred to as a scan-to-folder function.

A user may cause the scanner to execute the scan-to-folder function on the storage destination in a state where the above-mentioned information of the folder (the storage destination) is mistakenly registered in the scanner, which results in a communication error.

The user may also change login information needed to log-in to the PC separately after registering the storage destination correctly into the scanner. The user may cause the scanner to execute the scan-to-folder function in a state where the user forgets to make a configuration change in the scanner required with the change in the login information, which results in a communication error.

In a case where the communication error occurs when the scanner executes the scan-to-folder function, the storage of the read data fails to be stored, which will hinder the user's work. Therefore, there is a desire to make it possible to confirm at an appropriate timing whether the communication error occurs to eliminate the above-mentioned disadvantages of the user.

SUMMARY

An image reading device includes a reading transmission function of transmitting read data, generated by reading an original document, to a storage destination for storing the read data, the storage destination being included in an external device, the image reading device including a control unit configured to execute a communication test for determining whether communication with the storage destination is successfully performed, wherein the control unit includes a manual test mode for starting the communication test in response to an execution instruction of the communication test from a user and an automatic test mode for setting an starting condition for starting the communication test in accordance with user operation, and starting the communication test when the starting condition is satisfied.

A communication test method executed by an image reading device including a reading transmission function of transmitting read data, generated by reading an original document, to a storage destination for storing the read data, the storage destination being included in an external device, includes a manual test step for starting a communication test in response to an execution instruction of the communication test from a user, the communication test being performed to determine whether communication with the storage destination is successfully performed, a setting step for setting an starting condition for starting the communication test in accordance with user operation, and an automatic test step for starting the communication test when the starting condition is satisfied.

DESCRIPTION OF EXEMPLARY EMBODIMENTS

Exemplary embodiments of the present disclosure will be described below with reference to the accompanying drawings. Note that each of the drawings is merely illustrative for describing the exemplary embodiment. Since the drawings are illustrative, proportions and shapes may not be precise, match each other, or some may be omitted.

1. Outline of Device Configuration

Figure 1:
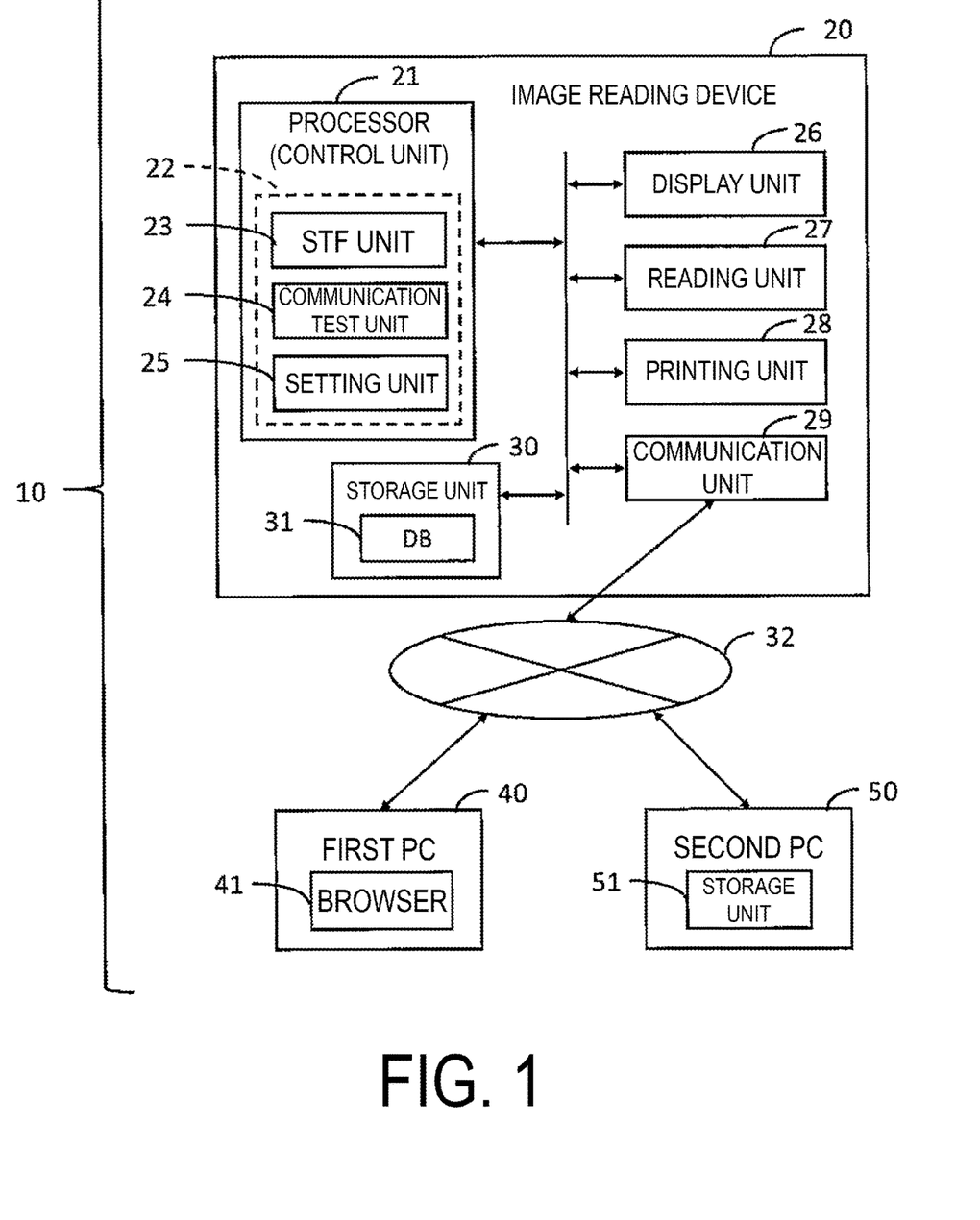
FIG. 1 is a block diagram illustrating a system in a simplified manner.

FIG. 1 illustrates a configuration of a system 10 according to the exemplary embodiment by a block diagram, in a simplified manner. The system 10 includes an image reading device 20, a first PC 40, and a second PC 50 coupled to a network 32. The system 10 may be referred to as an image reading system, a reading transmission system, etc. The first PC 40 and the second PC 50 are examples of external devices seen from the image reading device 20. The network 32 is a communication network appropriately including a local area network or the Internet. The external device is not limited to a PC, and may be a tablet terminal, a smartphone, etc.

The image reading device 20 includes a processor 21 made of a CPU, etc. The processor 21 corresponds to a "control unit". The processor 21 functions as a STF unit 23, a communication test unit 24, a setting unit 25, etc. in accordance with a program 22 and data stored in a predetermined memory. The STF stands for the scan-to-folder. The processor 21 causes the image reading device 20 to execute a "communication test method" of the present exemplary embodiment. The image reading device 20 includes a display unit 26, a reading unit 27, a printing unit 28, a communication unit 29, a storage unit 30, etc.

The display unit 26 displays a user interface (UI) screen capable of accepting operation from a user under control by the processor 21. The display unit 26 may be a touch panel display or may be a touch-inaccessible display capable of touch input by a user. When the display unit 26 is a touch inaccessible display, the display unit 26 accepts the input to the UI screen through operation via physical buttons, etc. (not illustrated) present outside the display unit 26.

The reading unit 27 is a mechanism for reading an original document and generating read data as a result of reading, under control by the processor 21. As is known, the reading unit 27 has a light source, various optical systems, image sensors, etc. The printing unit 28 is a mechanism for performing printing on a printing medium based on image data. The printing unit 28 performs printing using an ink-jet method or an electronic photo method, for example. Of course, the printing unit 28 is capable of performing printing based on the read data generated by the reading unit 27. That is, the printing unit 28 is capable of copying the original document. The image reading device 20 having the reading unit 27 can be referred to as a scanner. The image reading device 20 having the reading unit 27 and the printing unit 28 can be referred to as a composite machine or a copying machine. However, the image reading device 20 may be a product that does not include the printing unit 28.

The communication unit 29 is a generic term for one or more interfaces for the image reading device 20 to perform communication with the external device via wired or wireless communication over a predetermined communication protocol. In the example of FIG. 1, the image reading device 20 is coupled to the network 32 by the communication unit 29.

The STF unit 23 is capable of executing a reading transmission function that causes the reading unit 27 to generate the read data by reading the original document, transmit and store the read data to the communication unit 29 to a storage destination for storing the read data, the storage destination being included in the external device (hereinafter, the storage destination). Such a reading transmission feature is referred to as a scan-to-folder function.

The storage unit 30, which is constituted by a memory and a storage device included in the image reading device 20, stores a storage destination database 31 in which the storage destination information is registered. The database is abbreviated as DB. The DB may be translated into a table. The storage destination DB 31 is described below with reference to FIG. 5.

The first PC 40 is the external device that is operated by the user to select an starting condition for automatically starting a "communication test", as described below. The first PC 40 is equipped with a browser 41 by which websites can be viewed. The second PC 50 has a storage unit 51, which is the storage destination. The communication test is a process such that the image reading device 20 determines whether communication with the storage destination is successfully performed. The storage unit 51 includes, for example, a hard disk drive (HDD), a solid state drive (SSD), or other memory. The first PC 40 and the second PC 50 each have, of course, a configuration or a function generally included in an external device such as a PC.

In FIG. 1, the first PC 40 and the second PC 50 are described separately, but these may be the same machine. That is, the external device operating for the user to select the starting condition of the communication test and the external device having the storage destination may be the same. Note that in the present exemplary embodiment, the storage destination refers to a storage location that is referred to as a folder or directory that is sectioned and secured in a storage device, or a concept thereof, rather than referring to the entire storage device such as an HDD. Of course, the storage destination may be secured in each of a plurality of external devices, such as the first PC 40, the second PC 50, and a PC not illustrated in the drawings.

2. Setup of Communication Test Starting Condition

Figure 2:
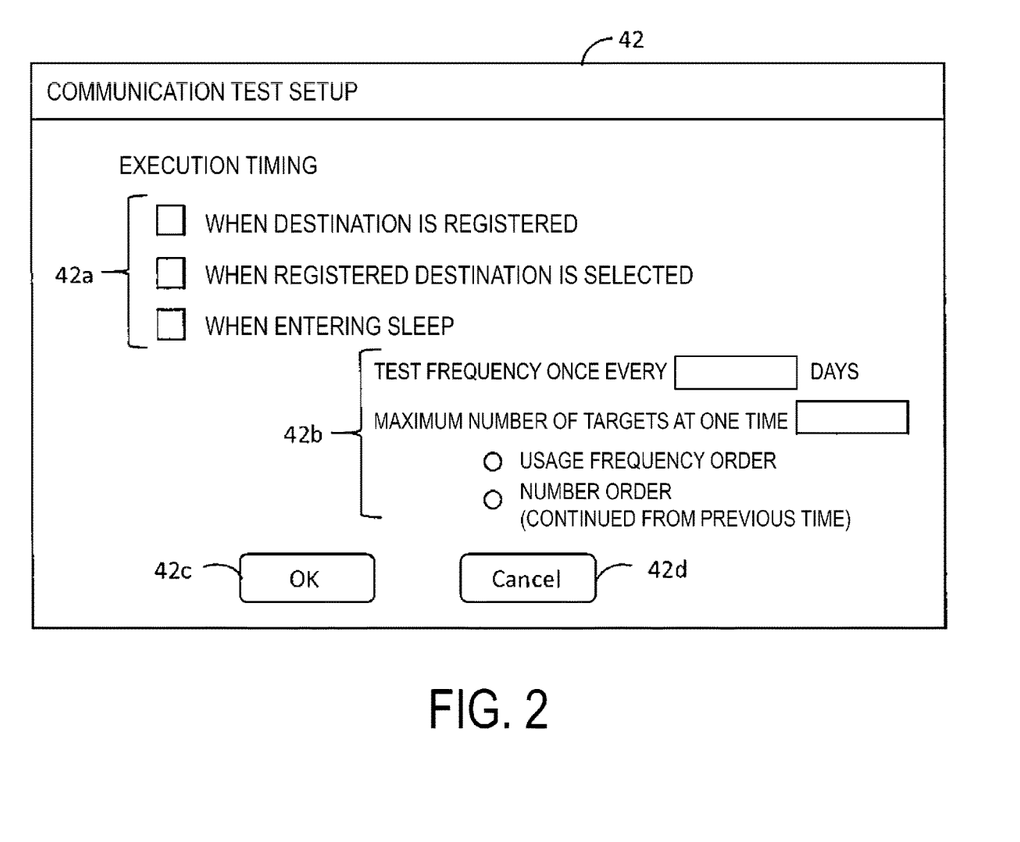
FIG. 2 is a diagram illustrating an example of a communication test setup screen.

FIG. 2 illustrates an example of a communication test setup screen 42. The browser 41 causes a predetermined display unit included in the first PC 40 to display the communication test setup screen 42.

The image reading device 20 also serves as a type of web server on the network 32. The image reading device 20 provides a website for accepting various registrations and selections for the image reading device 20, to the external device that couples to the network 32. The communication test setup screen 42 is a portion of such a website. That is, the browser 41 requests the image reading device 20 to view the communication test setup screen 42 through the network 32 to cause the communication test setup screen 42 to be displayed on the display unit of the first PC 40. The image reading device 20 recognizes the input to these websites.

According to FIG. 2, the communication test setup screen 42 includes a starting condition selection section 42a, a detail input section 42b, an OK button 42c, and a cancel button 42d. A plurality of the starting conditions for the communication test are listed in the starting condition selection section 42a, at which "when a destination is registered", "when a registered destination is selected", and "when entering sleep" are listed, for example. The user can optionally select one or more starting conditions from among these multiple starting conditions by operation on the communication test setup screen 42. Note that the "destination" means substantially the same as the storage destination.

"When a destination is registered" means when receiving a request for registration of the storage destination or change of the registered storage destination, which is also referred to as a "first condition".

"When a registered destination is selected" means when receiving a selection for any of the registered storage destinations, which is also referred to as a "second condition".

"When entering sleep" means when the image reading device 20 transitions to a sleep state, which is also referred to as a "third condition". The "sleep state" refers to a state such that the image reading device 20 is configured to suppress power consumption than a normal state, which is also referred to as a power saving state, an energy saving state, etc.

The detail input section 42b is a column for causing the user to input more detailed information when the third condition is selected in the starting condition selection section 42a. For example, in a case where the communication test is not executed every time it enters sleep but executed periodically when it enters sleep, the user can input the frequency of the communication test in the detail input section 42b, such as "once a few days".

Figure 4:
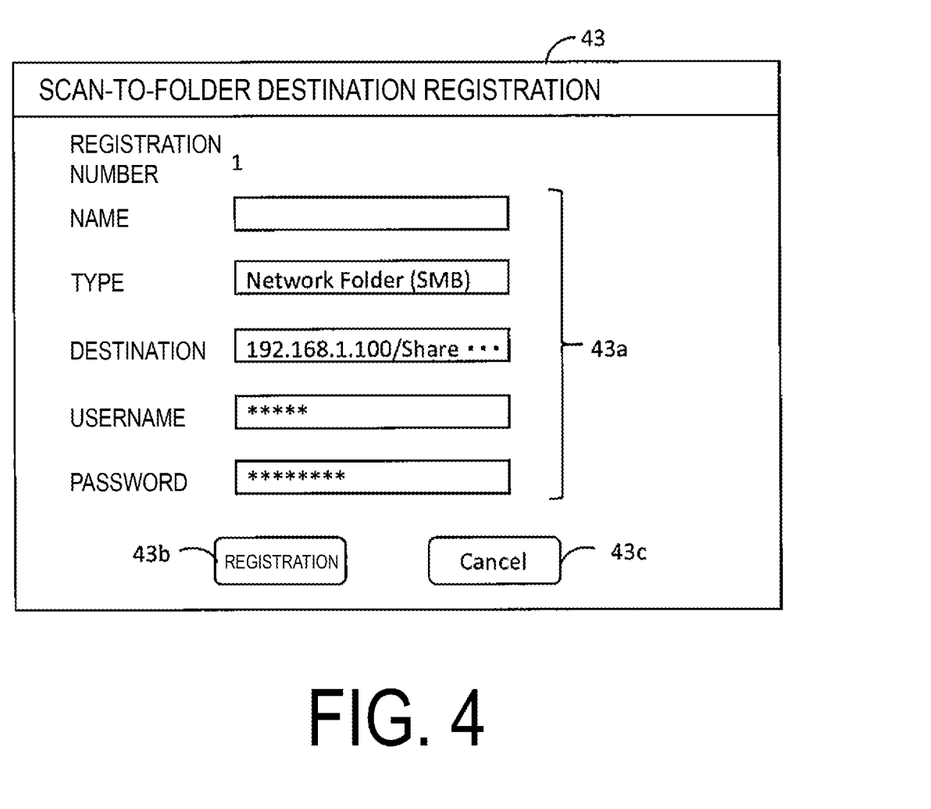
FIG. 4 is a diagram illustrating an example of a storage destination registration screen.
Figure 5:
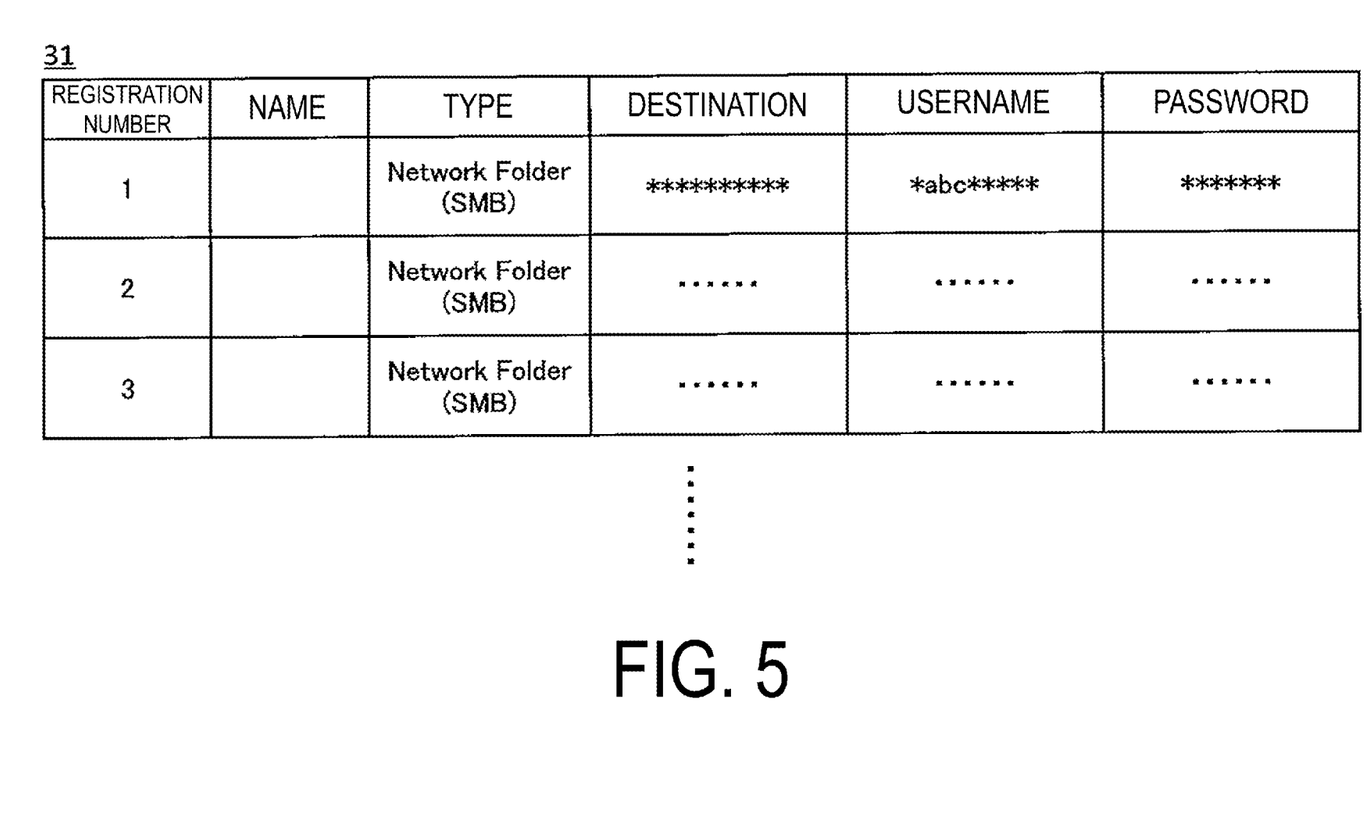
FIG. 5 is a diagram illustrating an example of a storage destination DB.

The user can also input, into the detail input section 42b, a maximum number of storage destinations that are subject to the communication test when entering the sleep state. Furthermore, the user can input, into the detail input section 42b, in what order the communication test should be executed for the plurality of storage destinations as the maximum number. According to the example of FIG. 2, the user can select whether to execute the communication test in order of higher usage frequency for the plurality of storage destinations or to execute the communication test in number order. The usage frequency refers to the frequency and the number of times which the image reading device 20 has previously been selected as a storage destination by the user when the image reading device 20 executes the scan-to-folder function. Further, each storage destination registered in the storage destination DB 31 is associated with a number as illustrated in FIGS. 4 and 5. Such a usage frequency order and such a number order correspond to the priority when the communication test for the plurality of storage destinations is executed.

With the user optionally performing input into the starting condition selection section 42a or the detail input section 42b, the user operates the OK button 42c to confirm the input to the communication test setup screen 42. The setting unit 25 of the image reading device 20 sets and stores information that is input to the starting condition selection section 42a and the detail input section 42b at the time when the OK button 42c is operated, as information related to the starting condition of the communication test. In this manner, the setting unit 25 performs a "setting step" for setting the starting condition for starting the communication test according to the operation by the user.

The image reading device 20 may display, on the display unit 26, the communication test setup screen 42 or the UI screen that is capable of accepting the input similar to the communication test setup screen 42. In other words, the setting unit 25 may set the starting condition of the communication test according to the operation for the screen displayed by the display unit 26.

3. Communication Test in Automatic Test Mode

Next, the communication test according to an automatic test mode will be described with an assumption that at least one communication test starting condition is set, such as the first condition, the second condition, and the third condition. In other words, the processor 21 performs the operation in the automatic test mode in a case where one or more starting conditions of the communication test are set through the communication test setup screen 42, etc.

Figure 3:
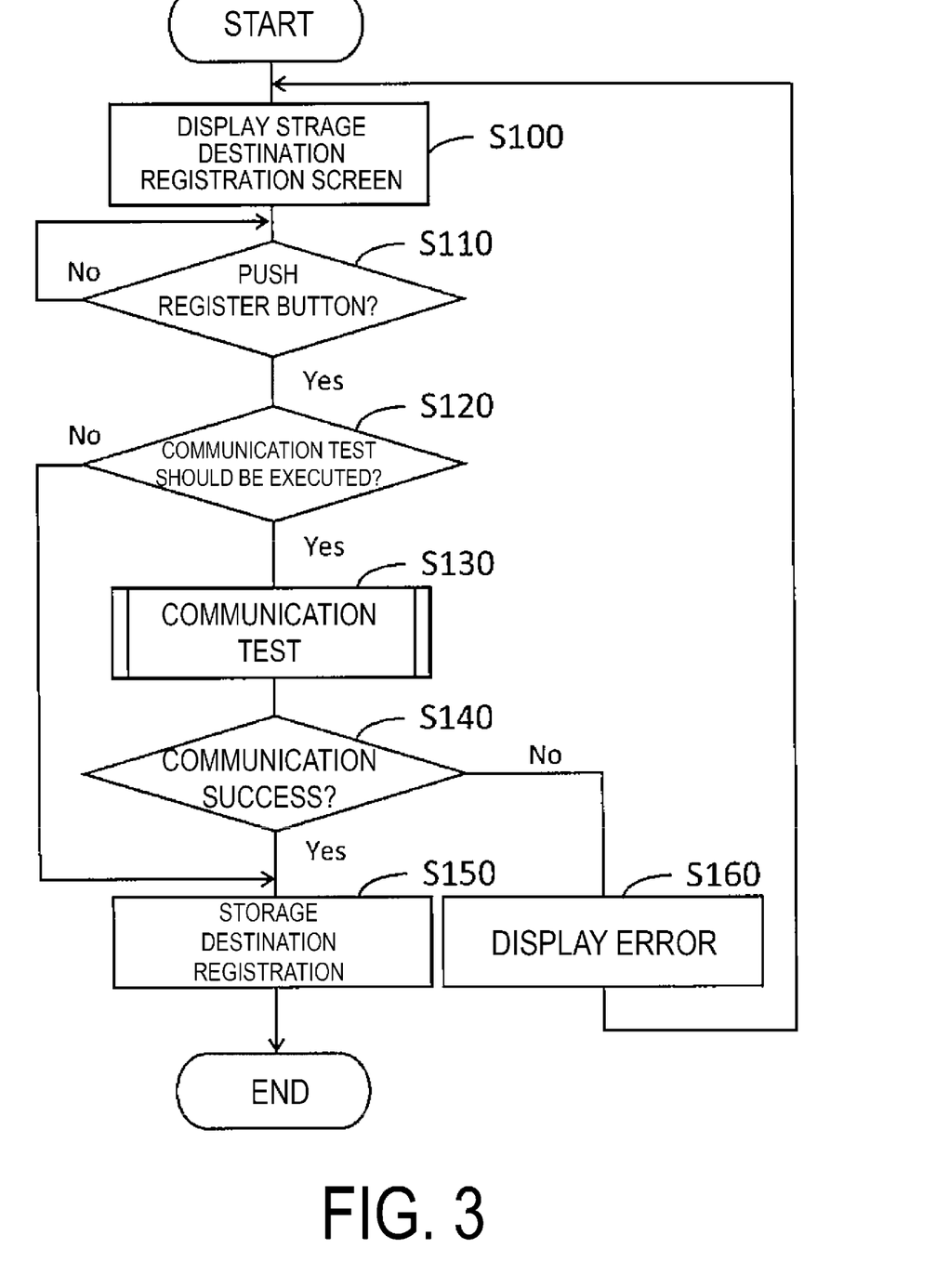
FIG. 3 is a flowchart for describing a communication test during storage destination registration.

FIG. 3 is a flowchart illustrating a "communication test during storage destination registration", which is one of the communication tests in the automatic test mode executed by the processor 21.

Similar to displaying the communication test setup screen 42, the browser 41 of the first PC 40 causes the display unit of the first PC 40 to display a storage destination registration screen 43 for the scan-to-folder function.

FIG. 4 illustrates an example of the storage destination registration screen 43. The storage destination registration screen 43 is also a portion of the website that the image reading device 20 provides to the external device that couples to the network 32. In other words, in response to the request for the storage destination registration screen 43 from the first PC 40, the processor 21 causes the storage destination registration screen 43 to be displayed on the display unit of the first PC 40 (step S100).

The storage destination registration screen 43 includes a storage destination information input section 43a, a registration button 43b, and a cancel button 43c corresponding to one registration number. To the storage destination information input section 43a, the user inputs storage destination information such as "name" or "type" or "destination" of the storage destination to be registered in the storage destination DB 31, and "username" or "password" as login information. The "name" of the storage destination is a name arbitrarily given by the user so that the folder as the storage destination can be easily recognized. The "type" is information indicating whether the storage destination is in the image reading device 20 or in the external device coupled to the network 32.

In the storage destination information input section 43a, the "destination" is information representing the storage destination directly, and is constituted of, for example, information such as an IP address or domain name of the external device, and a path (Path) indicating a location of the folder in the external device. Here, it is assumed that the user inputs a folder including the second PC 50 as the storage destination. The "username" and "password" are preset login information necessary to log-in to the external device having the storage destination.

The user can newly input the storage destination information into the empty storage destination information input section 43a corresponding to a single registration number, or edit the storage destination information input section 43a in which the registered storage destination information is displayed corresponding to a single registration number. The user operates the registration button 43b while optionally performing input or edit on such a storage destination information input section 43a. The operation of the registration button 43b can be said to be a request from the user to the image reading device 20 for the registration of the storage destination or the change of the registered storage destination.

The communication test unit 24 repeatedly determines whether pressing operation has been performed on the registration button 43b of the storage destination registration screen 43 (step S110). When there is the pressing operation on the registration button 43b, the communication test unit 24 determines "Yes" and proceeds to step S120. Determining "Yes" in step S110 means that the first condition has been satisfied.

In step S120, the communication test unit 24 determines whether the communication test should be executed, and proceeds to step S130 when the communication test should be executed, and proceeds to step S150 when the communication test should not be executed. In other words, when the first condition is set as the starting condition of the communication test, the communication test unit 24 determines "Yes" in step S120. When the first condition is not set as the starting condition of the communication test, the communication test unit 24 determines "No" in step S120.

In step S130, the communication test unit 24 executes a communication test on a "target storage destination". The target storage destination is, in step S130, of course the storage destination specified by the storage destination information that is input to the storage destination information input section 43a at the time when the registration button 43b has been operated. Details of the communication test will be described later with reference to FIG. 6. Such a flow of steps S110, S120, S130 corresponds to one of the "automatic test steps" in which the communication test is started when the starting condition is satisfied.

In step S140 after step S130, the communication test unit 24 branches the processing depending on whether the communication test of step S130 is successful, i.e., whether the communication with the storage destination is successfully performed. When the communication test is successful, the communication test unit 24 proceeds to step S150 from the determination of "Yes" in step S140. When the communication test is not successful, the communication test unit 24 proceeds to step S160 from the determination of "No" in step S140.

In step S150, the setting unit 25 associates the storage destination information that is input to the storage destination information input section 43a at the time when the registration button 43b has been operated, with the registration number being the target, and register it to the storage destination DB 31. Alternatively, the setting unit 25 overwrites the storage destination information registered in the storage destination DB 31 associated with the registration number being the target, with the storage destination information that is input to the storage destination information input section 43a at the time when the registration button 43b has been operated.

FIG. 5 illustrates an example of the storage destination DB 31. According to FIG. 5, in the storage destination DB 31, the storage destination, that is, the storage destination information is registered one-to-one with each registration number starting from 1. After step S150, the flowchart of FIG. 3 ends.

In step S160, the processor 21 receives the result of the communication test of step S130, and causes the predetermined display unit to display a communication error. As described above, in a case where the display unit of the first PC 40 displays the storage destination registration screen 43, the processor 21 may display the communication error to the display unit of the first PC 40.

Details of the error indication by step S160 will be described below with reference to FIGS. 7A, 7B, 7C, and 7D. The processor 21 proceeds through step S160 to step S100 to continue to display the storage destination registration screen 43, thereby prompting the user to input to the correct storage destination, i.e., the storage destination such that the communication test is successful.

Needless to say, the image reading device 20 may cause the display unit 26 to display the UI screen capable of accepting the same input as the storage destination registration screen 43 or the storage destination registration screen 43, and to display the error indication in step S160.

Figure 6:
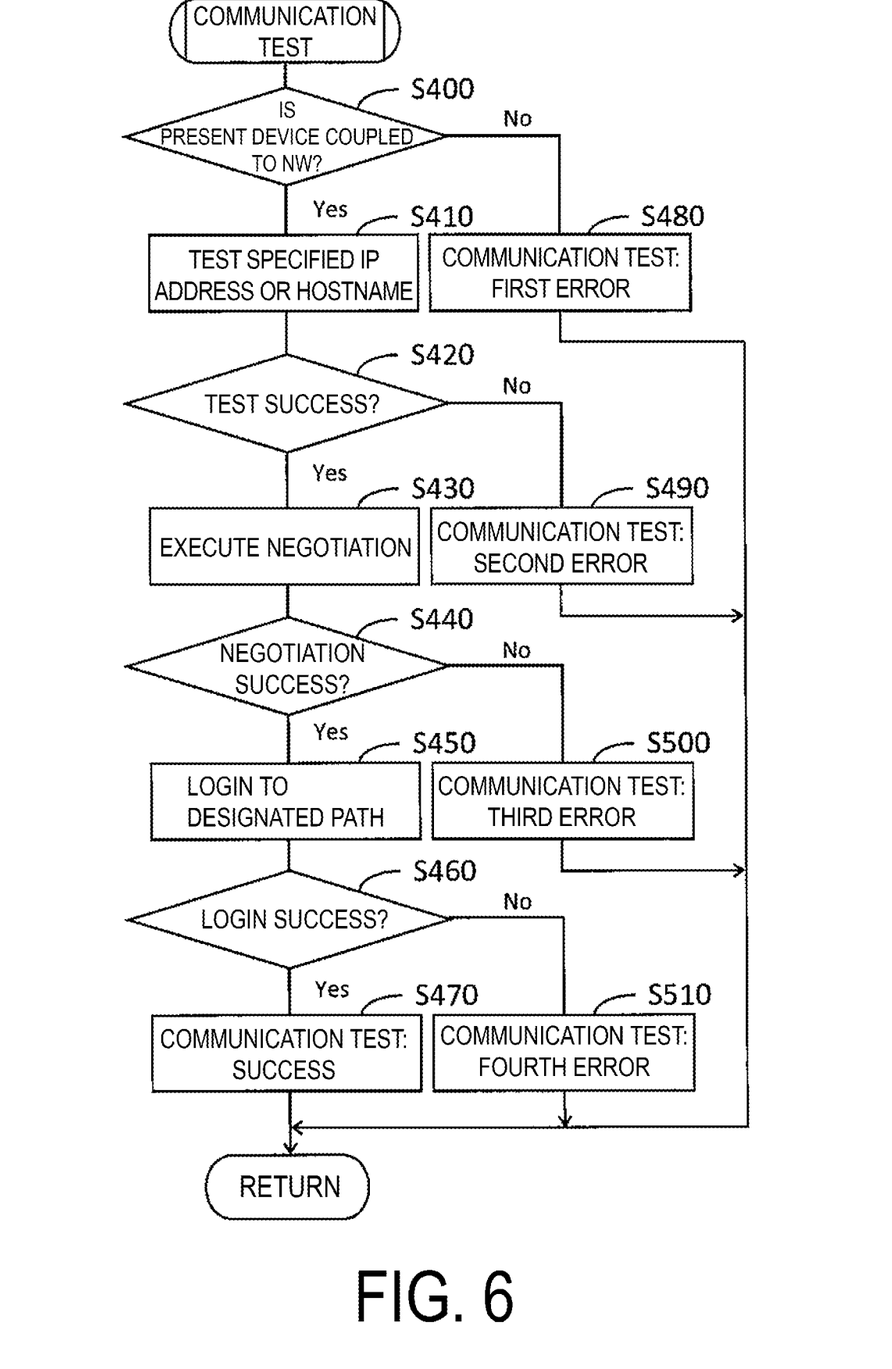
FIG. 6 is a flowchart illustrating details of a communication test.

FIG. 6 illustrates details of the communication test by a flow chart.

In step S400, the communication test unit 24 determines whether the present device, i.e., the image reading device 20 is coupled to the network 32. In FIG. 6, the network is abbreviated as NW. When the communication test unit 24 determines that the communication test unit 24 can be coupled to the network 32 via the communication unit 29 by a predetermined network diagnostic method, the communication test unit 24 proceeds to step S410 from the determination of "Yes", while when it is determined that the communication test unit 24 cannot be coupled to the network 32, the communication test unit 24 proceeds to step S480 from the determination of "No".

In step S480, the communication test unit 24 stores the result of the communication test as being a first error, and terminates the flowchart of FIG. 6. The first error is an error in a sense that the present device is uncoupled to the network 32.

In step S410, the communication test unit 24 tests whether the specified IP address or hostname is information that can be successfully used. The hostname is also referred to as a domain name. Here, it is assumed that the IP address or hostname of the external device is specified as a portion of the storage destination information for the target storage destination. The communication test unit 24 tests whether the MAC address can be determined from the specified IP address using a so-called address resolution protocol. Alternatively, the communication test unit 24 test whether the IP address can be determined from the specified hostname using a so-called name resolution protocol.

In step S420, the communication test unit 24 determines whether the test of step S410 is successful. The communication test unit 24 proceeds to step S430 when the test of step S410 is successful, while the communication test unit 24 proceeds to step S490 when the test of step S410 is not successful.

In step S490, the communication test unit 24 stores the result of the communication test as being a second error, and terminates the flowchart of FIG. 6. The second error is an error meaning that there is a possibility of any of the following a, b, and c:

a. The IP address or hostname of the external device as the target storage destination is incorrect;
b. The external device is not activated; and
c. The network is disconnected between the present device and the external device.

In step S430, the communication test unit 24 executes negotiation based on a protocol used for communication using the scan-to-folder function, between the communication test unit 24 and the external device serving as the target storage destination. Here, assuming that the SMB protocol is used for communication by the scan-to-folder function, the communication test unit 24 executes the negotiation required to perform communication in line with the SMB protocol between the communication test unit 24 and the second PC 50.

In step S440, the communication test unit 24 determines whether the negotiation of step S430 is successful. The communication test unit 24 proceeds to step S450 when the negotiation is successful, while the communication test unit 24 proceeds to step S500 when the negotiation is not successful.

In step S500, the communication test unit 24 stores the result of the communication test as being a third error, and terminates the flowchart of FIG. 6. The third error is an error in a sense that the negotiation of the protocol used for communication by the scan-to-folder function failed.

In step S450, the communication test unit 24 attempts to log-in to the specified path. As described above, as a portion of the storage destination information for the target storage destination, the login information to the external device and the path of the folder in the external device are specified, and thus login is performed in accordance with these information.

In step S460, the communication test unit 24 determines whether the login of step S450 is successful. The communication test unit 24 proceeds to step S470 when the login of step S450 is successful, while the communication test unit 24 proceeds to step S510 when the login of step S450 is not successful.

In step S470, the communication test unit 24 stores that the communication test for the target storage destination is successful, and terminates the flowchart of FIG. 6.

In step S510, the communication test unit 24 stores the result of the communication test as being a fourth error, and terminates the flowchart of FIG. 6. The fourth error is an error meaning that there is a possibility of any of the following d, e, and f:

d. The path specifying the storage destination is incorrect;
e. The username as login information is incorrect; and
f. The password as login information is incorrect.

Return to the description of FIG. 3. When the result of the communication test of step S130 corresponds to any of the first to fourth errors, the communication test unit 24 determines "No" in step S140 and proceeds to step S160. In step S160, the processor 21 causes a different communication error screen to be displayed as an error indication depending on whether the result of the communication test of step S130 is any of the first to fourth errors.

Figure 7A:
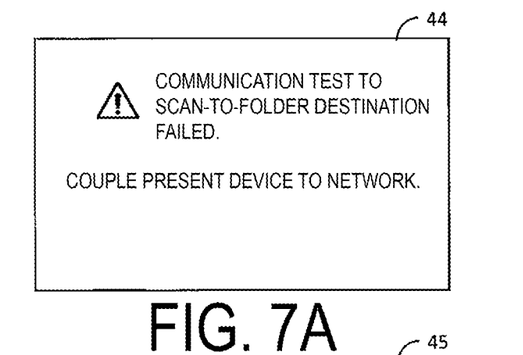
FIG. 7A is a diagram illustrating an example of a communication error screen corresponding to a first error.

FIG. 7A illustrates an example of a communication error screen 44 displayed on the display unit in step S160. The processor 21 causes the communication error screen 44 to be displayed when the result of the communication test is the first error. As illustrated in FIG. 7A, in addition to the fact that the communication test to the target storage destination has failed, a message, such as a detail of the first error, an advice for resolving the first error, etc. are described on the communication error screen 44.

Figure 7B:
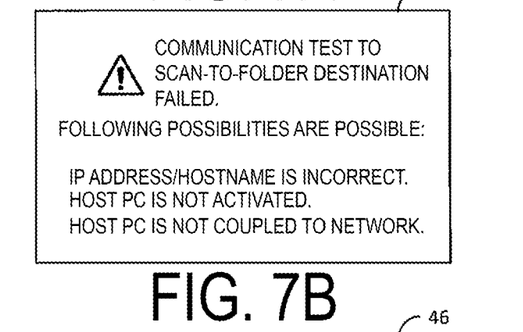
FIG. 7B is a diagram illustrating an example of a communication error screen corresponding to a second error.

FIG. 7B illustrates an example of a communication error screen 45 displayed on the display unit in step S160. The processor 21 causes the communication error screen 45 to be displayed when the result of the communication test is the second error. As illustrated in FIG. 7B, in addition to the fact that the communication test to the target storage destination has failed, a message, such as a detail of the second error, an advice for resolving the second error, etc. are described on the communication error screen 45.

Figure 7C:
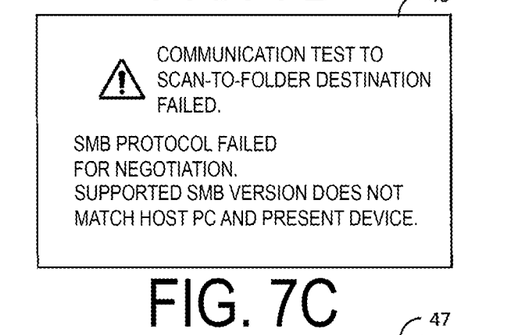
FIG. 7C is a diagram illustrating an example of a communication error screen corresponding to a third error.

FIG. 7C illustrates an example of a communication error screen 46 displayed on the display unit in step S160. The processor 21 causes the communication error screen 46 to be displayed when the result of the communication test is the third error. As illustrated in FIG. 7C, in addition to the fact that the communication test to the target storage destination has failed, a message, such as a detail of the third error, an advice for resolving the third error, etc. are described on the communication error screen 46.

Figure 7D:
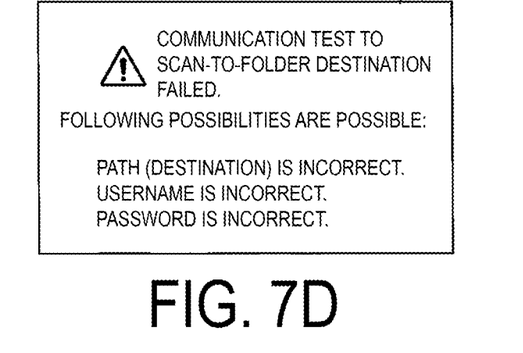
FIG. 7D is a diagram illustrating an example of a communication error screen corresponding to a fourth error.

FIG. 7D illustrates an example of a communication error screen 47 displayed on the display unit in step S160. The processor 21 causes the communication error screen 47 to be displayed when the result of the communication test is the fourth error. As illustrated in FIG. 7C, in addition to the fact that the communication test to the target storage destination has failed, a message, such as a detail of the fourth error, an advice for resolving the fourth error, etc. are described on the communication error screen 47.

Figure 8:
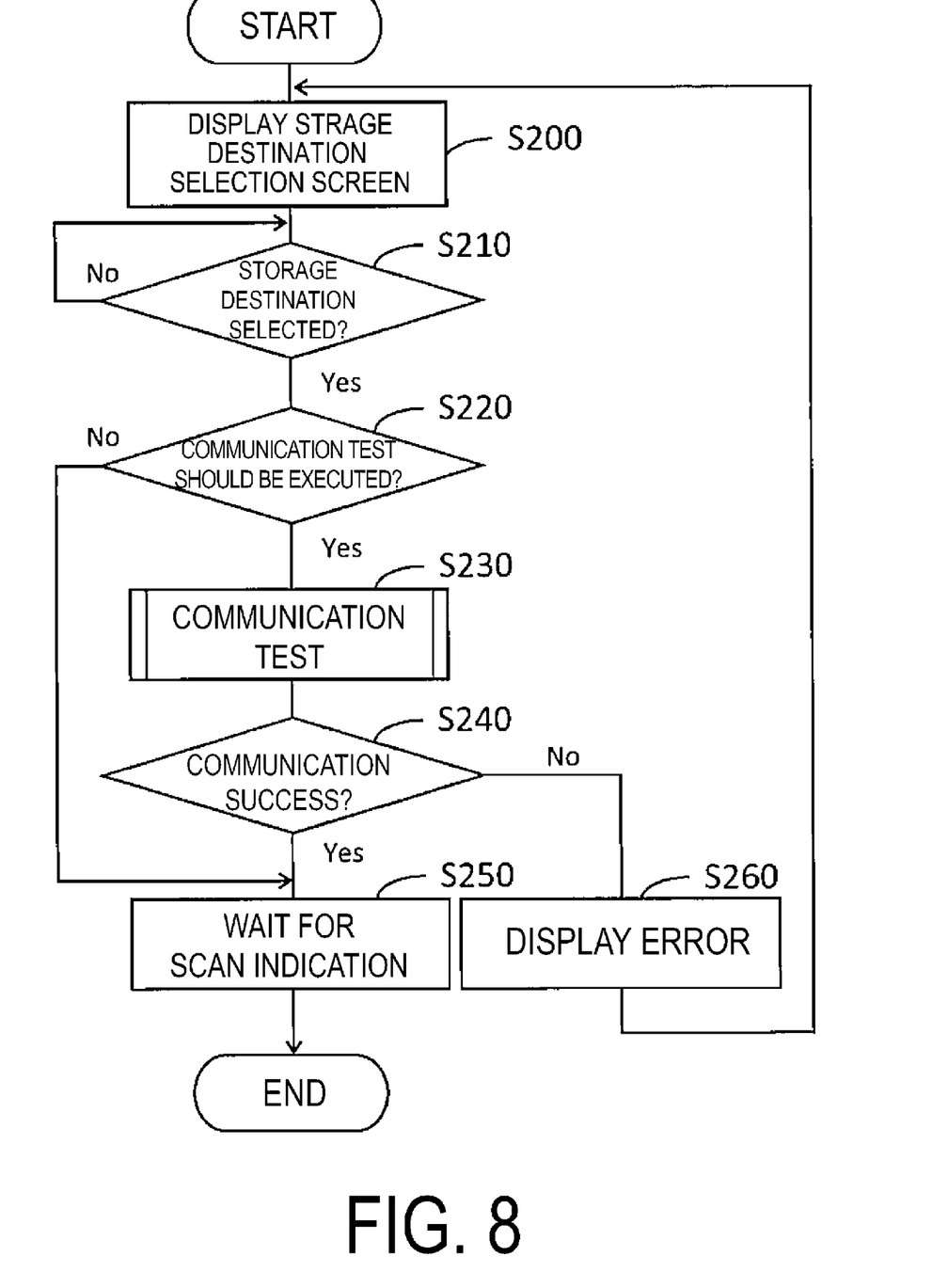
FIG. 8 is a flowchart for describing a communication test when a storage destination is selected.

FIG. 8 is a flowchart illustrating a "communication test during storage destination selection", which is one of the communication tests in the automatic test mode executed by the processor 21.

"During storage destination selection" means when the user selects the storage destination prior to causing the image reading device 20 to execute the scan-to-folder function.

The processor 21 causes a storage destination selection screen, for the user selecting the storage destination, to be displayed on the predetermined display unit (step S200). Here, the storage destination selection screen is displayed on the display unit 26. The storage destination selection screen is a UI screen presenting to the user each storage destination registered in the storage destination DB 31 as an option as illustrated in FIG. 5. The user performs the operation of selecting the storage destination arbitrarily from among the plurality of storage destinations indicated as an option on the storage destination selection screen. The user selects, for example, the storage destination that is registered in association with the registration number=3.

The communication test unit 24 repeatedly determines whether there has been operation to select the storage destination for the storage destination selection screen (step S210). The communication test unit 24 determines "Yes" when there is the operation to select the storage destination, and proceeds to step S220. Determining "Yes" in step S210 means that the second condition has been satisfied.

In step S220, the communication test unit 24 determines whether the communication test should be executed, and proceeds to step S230 in a case where the communication test should be executed, and proceeds to step S250 in a case where the communication test should not be executed. In other words, when the second condition is set as the starting condition of the communication test, the communication test unit 24 determines "Yes" in step S220. When the second condition is not set as the starting condition of the communication test, the communication test unit 24 determines "No" in step S220.

In step S230, the communication test unit 24 executes the communication test on the target storage destination. In step S230, the storage destination selected to the user in the storage destination selection screen is the target storage destination. Details of the communication test for the target storage destination are as described with reference to FIG. 6. Such a flow of steps S210, S220, S230 corresponds to one of the "automatic test steps" in which the communication test is started when the starting condition is satisfied.

Further, the flow of executing step S260 from the determination of step S240 in response to the result of step S230 is the same as the flow of executing step S160 from the determination of step S140 in response to the result of step S130 in FIG. 3. When the communication test of step S230 is successful, the communication test unit 24 proceeds to step S250 from the determination of "Yes" in step S240.

In step S250, the STF unit 23 terminates the flowchart of FIG. 8 while waiting for a scan instruction by the user. In other words, thereafter, when the STF unit 23 accepts the scan instruction by the user via operation of the display unit 26 or physical buttons (not illustrated), the STF unit 23 executes the scan-to-folder function in which the storage destination selected by the user on the storage destination selection screen described above is set as the storage destination of the read data.

Figure 9:
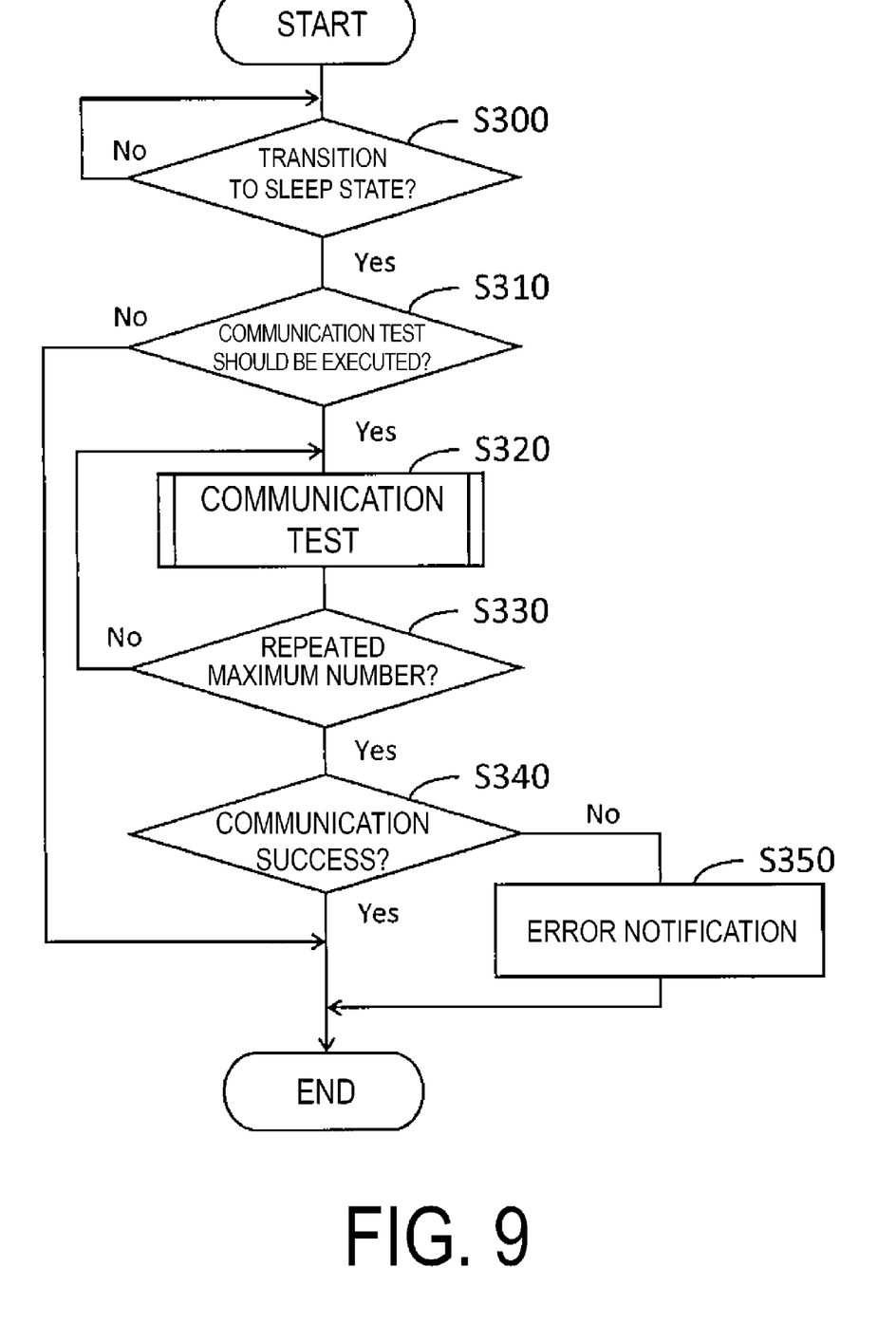
FIG. 9 is a flowchart for describing a communication test when entering sleep.

FIG. 9 is a flowchart illustrating a "communication test when entering sleep", which is one of the communication tests in the automatic test mode executed by the processor 21.

The condition for the image reading device 20 to transition from the normal state to the sleep state that is not in a sleep state is predetermined. For example, the image reading device 20 can transition from the normal state to the sleep state when a state in which there is no user operation through the display unit 26, communication unit 29, etc. or no instruction from the external device continues for a predetermined period of time.

Thus, the communication test unit 24 repeatedly determines whether the image reading device 20 has been conditioned to transition from the normal state to the sleep state (step S300). The communication test unit 24 determines "Yes" when the condition for transitioning to the sleep state is satisfied, and proceeds to step S310. Determining "Yes" in step S300 means that the third condition has been satisfied.

In step S310, the communication test unit 24 determines whether the communication test should be executed, and proceeds to step S320 when the communication test should be executed, and terminates the flowchart of FIG. 9 when the communication test should not be executed. In other words, when the third condition is set as the starting condition of the communication test, the communication test unit 24 determines "Yes" in step S310. When the third condition is not set as the starting condition of the communication test, the communication test unit 24 determines "No" in step S310.

In a case where the third condition is set as the starting condition of the communication test, and the frequency of the communication test is also set by the detail input section 42b illustrated in FIG. 2, the communication test unit 24 determines step S310 based on this frequency. For example, it is assumed that the third condition is set as the starting condition of the communication test, and the frequency of the communication test is set to be "once every three days". In this case, in step S310, when the communication test unit 24 determines "Yes" in the previous step S310 and the next day of the day in which step S320 is executed is the first day, the communication test unit 24 may determine "Yes" and proceed to step S320 in a case where today is the third day or the third day has passed.

In step S320, the communication test unit 24 executes the communication test on the target storage destination. Details of the communication test for the target storage destination are as described with reference to FIG. 6. Such a flow of steps S300, S310, S320 corresponds to one of the "automatic test steps" in which the communication test is started when the starting condition is satisfied. However, the target storage destination in step S320 is a storage destination registered in the storage destination DB 31, and is one of the storage destinations corresponding to the maximum number of the storage destinations to be subjected to the communication test set by the detail input section 42b. The communication test unit 24 repeatedly executes step S320 for one of the plurality of target storage destinations.

For example, it is assumed that a total of 100 storage destinations with the registration numbers=1 to 100 are registered in the storage destination DB 31, and the maximum number set by the detail input section 42b is "30".

Then, it is assumed that the "usage frequency order" is set by the detail input section 42b. In this case, the communication test unit 24 sets the storage destination having the highest 30 usage frequencies among the 100 storage destinations registered in the storage destination DB 31 as the target storage destinations, and executes step S320 for these top 30 target storage destinations in order from the one with the highest usage frequency.

Alternatively, it is assumed that the "number order (continued from previous time)" is set by the detail input section 42b. In this case, the communication test unit 24 sets the storage destination of the registration number next to the 30th target storage destination when the determination is "Yes" in the previous step S310 and step S320 is repeatedly executed, as the storage destination of the first target storage destination this time, among the storage destinations registered in the storage destination DB 31. And then, the communication test unit 24 executes step S320 for 30 target storage destinations in the registration number order. Note that in a consideration of the number order, the next number of the largest registration number registered in the storage destination DB 31 is returned to the registration number=1.

The communication test unit 24 determines "No" in step S330 and repeats step S320 until step S320 is completed for a set maximum number of the target storage destinations. When completing step S320 for the set maximum number of the target storage destinations, the communication test unit 24 determines "Yes" in step S330 and proceeds to step S340. Note that in a case that the maximum number set by the detail input section 42b is greater than or equal to the number of the storage destination registered in the storage destination DB 31, the communication test unit 24 may repeat step S320 with all the registered storage destinations as the target storage destinations, and when the execution is completed, determine "Yes" in step S330.

In step S340, the communication test unit 24 branches the processing depending on whether the communication test of step S320 is successful. When all of the communication tests executed on each target storage destination are successful from the determination of "Yes" in step S310 to the determination of "Yes" in step S330, the communication test unit 24 determines "Yes" in step S340 and terminates the flowchart of FIG. 9. On the other hand, when an error occurs in at least one of the communication tests executed on each target storage destination from the determination of "Yes" in step S310 to the determination of "Yes" in step S330, the communication test unit 24 determines "No" in step S340 and proceeds to step S350.

In step S350, the processor 21 performs a notification of the communication error to a predetermined notification destination in response to the result of the communication test of step S320, and terminates the flowchart of FIG. 9. Specifically, the processor 21 performs a notification of the fact that the communication test has been error from the communication unit 29 to the predesignated e-mail address as the predetermined notification destination by an e-mail. In the e-mail as such an error notification, information indicating the target storage destination where the result of the communication test is an error, details of the error such as which of the first to fourth errors are described, etc., are described.

Note that in step S160 of FIG. 3 or step S260 of FIG. 8, the processor 21 may perform an error notification such as step S350 in conjunction with the error indication by the predetermined display unit. Of course, in step S350, the processor 21 may perform the error indication, such as steps S160, S260, in conjunction with the error notification.

The e-mail address as the predetermined notification destination may be registered, for example, in the storage destination DB 31 in association with each storage destination. That is, when the result of the communication test for a certain storage destination results in an error, the notification destination of the error is specified corresponding to this storage destination.

The processor 21 causes the image reading device 20 to transition from the normal state to the sleep state at the timing of the end of the flowchart of FIG. 9. That is, the processor 21 executes the automatic test mode communication test just before the image reading device 20 transitions to the sleep state.

4. Communication Test in Manual Test Mode

The communication test in a manual test mode will be described in a very simple manner.

Regardless of the absence of the setup of the starting condition of the communication test as described above, the user can provide the image reading device 20 with an execution instruction of the communication test to cause the image reading device 20 to execute the communication test in situ. That is, the user can select a menu of a manual communication test from among a plurality of menu options for the image reading device 20 through the website that the browser 41 displays on the first PC 40 and the UI screen displayed by the display unit 26. The user, who has selected the menu of the manual communication test, further selects the target storage destination through the website or the UI screen from among the storage destinations registered in the storage destination DB 31 to instruct the execution of the communication test. The communication test unit 24 immediately starts the communication test for the target storage destination based on receiving the selection and execution instruction.

For such a manual communication test, details of the communication test are as described in FIG. 6. Of course, the processor 21 can display, on the predetermined screen, whether the manual communication test is successful. If not, the processor 21 can display what kind of the error is, or perform a notification to the user by e-mail. In this manner, the image reading device 20 performs a "manual test step" for starting the communication test for determining whether communication with the storage destination is successfully performed in response to the execution instruction of the communication test by the user.

5. Summary

As described above, according to the present exemplary embodiment, the image reading device 20 includes the reading transmission function for transmitting and storing the read data, generated by reading the original document, to the storage destination included in the external device. The image reading device 20 includes the control unit (processor 21) configured to execute the communication test for determining whether communication with the storage destination is successfully performed, wherein the control unit includes the manual test mode for starting the communication test in response to the execution instruction of the communication test by the user and the automatic test mode for setting the starting condition for starting the communication test in accordance with the user operation, and starting the communication test when the starting condition is satisfied.

In a case where there is only the manual test mode, the user needs to remember all the timings at which it is better to execute the communication test and instruct the image reading device 20 to execute the communication test each time those timings come, but such is harsh to the user.

According to the configuration described above, the control unit executes the communication test in the automatic test mode as well as the communication test in the manual test mode. For the user, the image reading device 20 automatically executes the communication test when the preset starting condition is satisfied, so the burden is significantly reduced. In addition, further, it is possible to suppress a situation in which the communication error occurs after instructing the image reading device 20 to execute the scan-to-folder function and the reading data cannot be stored in a desired storage destination.

Further, according to the present exemplary embodiment, the starting condition includes the first condition that a request for registration of the storage destination or change of the registered storage destination is received.

According to the configuration described above, the control unit automatically starts the communication test for the corresponding storage destination when the control unit receives a request from the user for registration of the storage destination or change of the registered storage destination. As a result, the user can confirm whether registration or change of the storage destination to be performed is appropriate.

Also, according to the present exemplary embodiment, the starting condition includes the second condition that a selection for any of the registered storage destinations is received.

According to the configuration described above, the control unit automatically starts the communication test for the storage destination to select when the control unit receives a selection from the user for any of the registered storage destinations. Thus, the user can confirm whether the communication error occurs when instructing the execution of the scan-to-folder function at a timing at which the storage destination of the scan-to-folder function is selected.

Further, according to the present exemplary embodiment, the starting condition includes the third condition that the image reading device 20 transitions to the sleep state.

According to the configuration described above, the control unit automatically starts the communication test when the image reading device 20 transitions to the sleep state. That is, when the image reading device 20 is not in use, the communication test is periodically executed, for example, so that it is easy to prevent a situation where the communication error occurs when the user instructs to execute the scan-to-folder function.

Further, according to the present exemplary embodiment, the control unit may execute the communication a plurality of times in a case that the starting condition is satisfied, for a plurality of storage destinations.

According to the above-described configuration, the control unit can confirm whether the communication error occurs in a case where the scan-to-folder function is set as the storage destination for each of the plurality of storage destinations when the start condition is satisfied.

In addition, according to the present exemplary embodiment, the control unit may execute the communication test for the plurality of storage destinations in order of priority.

According to the configuration described above, the control unit can preferentially execute the communication test from the storage destination having a high need for the communication test when executing the communication test on a plurality of storage destinations that are not all of the registered storage destinations.

Further, according to the present exemplary embodiment, when determining that the communication is not successfully performed as a result of the communication test, the control unit may cause the predetermined display unit to display the communication error.

According to the configuration described above, it is possible to make the user operating the external device and the image reading device 20 to view that the result of the communication test is error.

In addition, according to the present exemplary embodiment, when determining that the communication is not successfully performed as a result of the communication test, the control unit may perform a notification of the communication error by an e-mail to the predesignated e-mail address.

According to the configuration described above, even in a situation where the user is not operating the image reading device 20 through the external device or the display unit 26, etc., it is possible to notify that the result of the communication test is error.

Note that, when the control unit determines successful as a result of the communication test, the control unit may display the successful communication test on the predetermined display unit, or notify the user via e-mail.

The present exemplary embodiment discloses various categories of disclosures, such as the system 10, the program 22, and the method, in addition to the image reading device 20.

For example, the communication test method executed by the image reading device 20 including the reading transmission function for transmitting and storing the read data, generated by reading the original document, to the storage destination included in the external device, includes the manual test step for starting the communication test in response to the execution instruction of the communication test by the user, the communication test being performed to determine whether communication with the storage destination is successfully performed, the setting step for setting the starting condition for starting the communication test in accordance with the user operation, and the automatic test step for starting the communication test when the starting condition is satisfied.

6. Modification Example

Various modification examples included in the exemplary embodiment will be described.

As described with reference to FIG. 9, when the third condition is satisfied ("Yes" in step S300) and the third condition is set as the start condition of the communication test ("Yes" in step S310), the processor 21 executes the communication test in step S320. When receiving a selection for any of the registered storage destinations during the execution of such a communication test, the processor 21 may abort the communication test being executed in step S320.

"When receiving a selection for any of the registered storage destinations" is synonymous with determining "Yes" in step S210 of FIG. 8. That is, in a situation in which the communication test is being executed in step S320, the user is basically deemed to be remote from the image reading device 20. However, it can be said that the fact that the storage destination is selected in such a situation indicates that the user intends to operate the image reading device 20 to use the scan-to-folder function. Accordingly, in this case, the processor 21 may abort the communication test executed in step S320 and perform the process of step S220 and subsequent steps. According to such a configuration, the control unit can abort the communication test with reduced need in response to the user's last operation. Then, the control unit can start a more required communication test.

Figure 10:
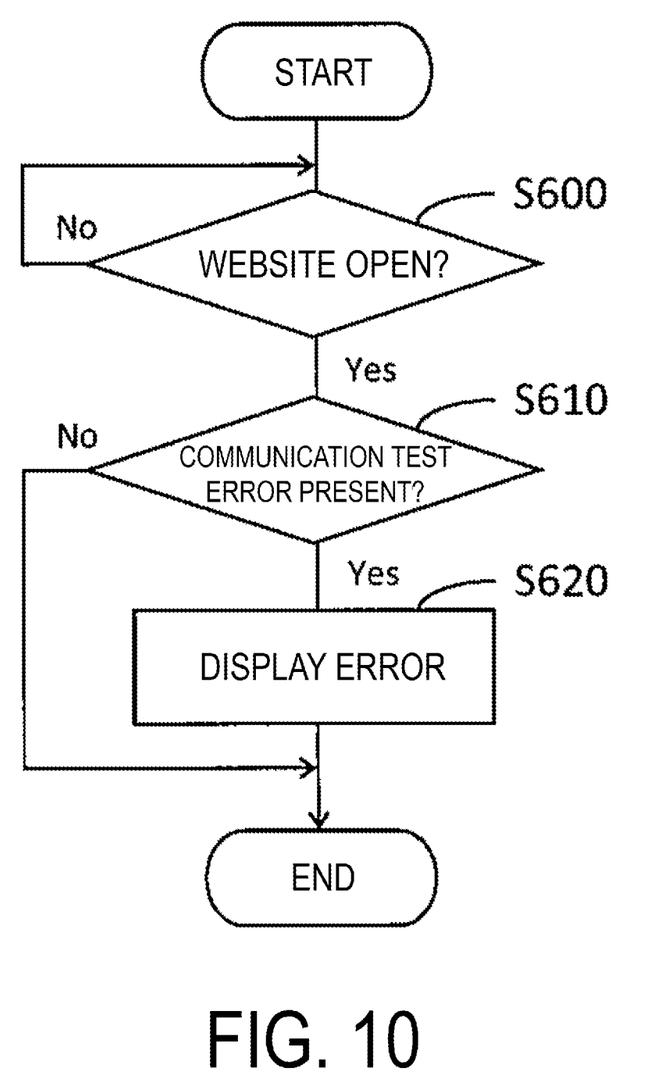
FIG. 10 is a flowchart for describing a website display pre-process.

FIG. 10 illustrates, by a flowchart, a website display pre-process executed by the browser 41 of the first PC 40. Here, the foregoing website refers to a website for accepting various registrations and selections for the image reading device 20 as described above. The communication test setup screen 42 and the storage destination registration screen 43 are portions of this website. The website display pre-process is a process prior to displaying the website as per the name.

The browser 41 in the activated state in the first PC 40 determines whether to open the website (step S600), and proceeds from "Yes" to step S610 when it is determined to open. That is, the browser 41 determines "Yes" in step S600 when the website URL is specified by user operation.

In step S610, the browser 41 determines whether an error is stored as a result of the communication test. The browser 41 queries the image reading device 20 via the network 32 whether the error is stored as a result of the communication test. The processor 21 of the image reading device 20 responds to this inquiry, e.g., whether the error is stored as a result of the communication test executed in the automatic test mode within the last or several days. When the browser 41 obtains a response that the error is stored as a result of the communication test, the browser 41 determines "Yes" in step S610 and proceeds to step S620. On the other hand, when the browser 41 obtains a response that the error is not stored as a result of the communication test, the browser 41 determines "No" in step S610 and terminates the website display pre-process.

In step S620, the browser 41 retrieves, from the image reading device 20, information of the error indicated by a response from the image reading device 20 to the query, and causes the display unit of the first PC 40 to display the information. The contents of the error displayed here may be understood to be the same as the error displayed in step S160 or step S260. The browser 41 terminates the website display pre-process via the display of step S620. The browser 41 that has terminated the website display pre-process naturally causes the website to be displayed on the display unit of the first PC 40.

In accordance with such a website display pre-process, the user views the error as a result of the executed communication test by the image reading device 20 prior to viewing the website when attempting to open the website on the browser 41. As a result, the user, who has not seen the display unit 26 of the image reading device 20 or the display unit of the first PC 40 when the image reading device 20 executes the communication test, can visually recognize the error later, i.e., when this user later tries to open the website, Not only when the third condition is satisfied as illustrated in FIG. 9, but also when the first condition is satisfied or when the second condition is satisfied, the processor 21 may repeat the communication test with the plurality of storage destinations serving as the target storage destinations. For example, when the processor 21 determines "Yes" in step S120 in FIG. 3, the processor 21 may add, to the target storage destination, not only the storage destination input to the storage destination information input section 43a when the registration button 43b of the storage destination registration screen 43 is operated, but also several storage destinations registered to the storage destination DB 31. Furthermore, the processor 21 may repeatedly execute the communication test of step S130 on the plurality of target storage destinations. Similarly, when the processor 21 determines "Yes" in step S220 in FIG. 8, the processor 21 may add, to the target storage destination, not only the storage destination selected on the storage destination selection screen, but also the other storage destination registered in the storage destination DB 31. Furthermore, the processor 21 may repeatedly execute the communication test of step S230 on the plurality of target storage destinations.

The processor 21 can set starting conditions other than the first to third conditions according to the user operation as the starting conditions for the communication test in the automatic test mode. For example, the processor 21 may set the fourth condition "after the image reading device 20 has transitioned to the sleep state" and start the communication test when the fourth condition is satisfied. The processor 21 may set the fifth condition "after the image reading device 20 has returned from the sleep state to the normal state" and start the communication test when the fifth condition is satisfied. Further, the processor 21 may set the sixth condition "when the image reading device 20 is not used for a certain period of time or longer" apart from the transition condition to the sleep mode and start the communication test when the sixth condition is satisfied. Note that for the third condition, the fourth condition, the fifth condition, and the sixth condition, the processor 21 configures the starting condition selectively among these conditions.

What is claimed is:

1. An image reading device including a reading transmission function of transmitting read data, generated by reading an original document, to a storage destination for storing the read data, the storage destination being included in an external device, the image reading device comprising a controller configured to execute a communication test for determining whether communication with the storage destination is successfully performed, wherein
the controller includes
a manual test mode for starting the communication test in response to an execution instruction of the communication test from a user and
an automatic test mode for starting the communication test when a starting condition for starting the communication test is satisfied, and
the controller is configure to, when any registered storage destination is selected during execution the communication test, abort the communication test being executed.

2. The image reading device according to claim 1, wherein
the starting condition includes a first condition that a request for registration of the storage destination or change of the storage destination registered is received.

3. The image reading device according to claim 1, wherein
the starting condition includes a second condition that any registered storage destination is selected.

4. The image reading device according to claim 1, wherein
the starting condition includes a third condition that the image reading device transitions to a sleep state.

5. The image reading device according to claim 1, wherein
the controller is configured to, when the starting condition is satisfied, execute the communication test for a plurality of the storage destinations as targets.

6. The image reading device according to claim 5, wherein
the controller is configured to execute the communication test for the plurality of storage destinations in order of priority.

7. The image reading device according to claim 1, wherein
the controller is configured to, when determining that the communication is not successfully performed as a result of the communication test, cause a predetermined display unit to display a notification of a communication error.

8. The image reading device according to claim 1, wherein
the controller is configured to, when determining that the communication is not successfully performed as a result of the communication test, perform a notification of a communication error by an e-mail to a predesignated e-mail address.

9. The image reading device according to claim 1, wherein
the controller unit-controller is configured to, when the starting condition set in accordance with user operation is satisfied, execute the communication test in the automatic test mode.

10. A communication test method executed by an image reading device including a reading transmission function of transmitting read data, generated by reading an original document, to a storage destination for storing the read data, the storage destination being included in an external device, the method comprising:
a manual test step for starting a communication test in response to an execution instruction of the communication test from a user, the communication test being performed to determine whether communication with the storage destination is successfully performed;
an automatic test step for starting the communication test when a starting condition for starting the communication test is satisfied; and
an aborting step for aborting the communication test being executed when any registered storage destination is selected during execution of the communication test.

11. An image reading device including a reading transmission function of transmitting read data, generated by reading an original document, to a storage destination for storing the read data, the storage destination being included in an external device, the image reading device comprising
a controller configured to execute a communication test for determining whether communication with the storage destination is successfully performed, wherein
the controller includes
a manual test mode for starting the communication test in response to an execution instruction of the communication test from a user and
an automatic test mode for starting the communication test when a starting condition for starting the communication test is satisfied,
the starting condition includes a condition that the image reading device transitions to a sleep state, and
the controller is configured to, when any registered storage destinations is selected during execution of the communication test, abort the communication test being executed.

* * * * *